Franklyn J. Wolff
INVENTOR

ATTORNEYS

June 23, 1936.  F. J. WOLFF  2,045,308
MIXING VALVE
Filed Dec. 9, 1933  2 Sheets-Sheet 2
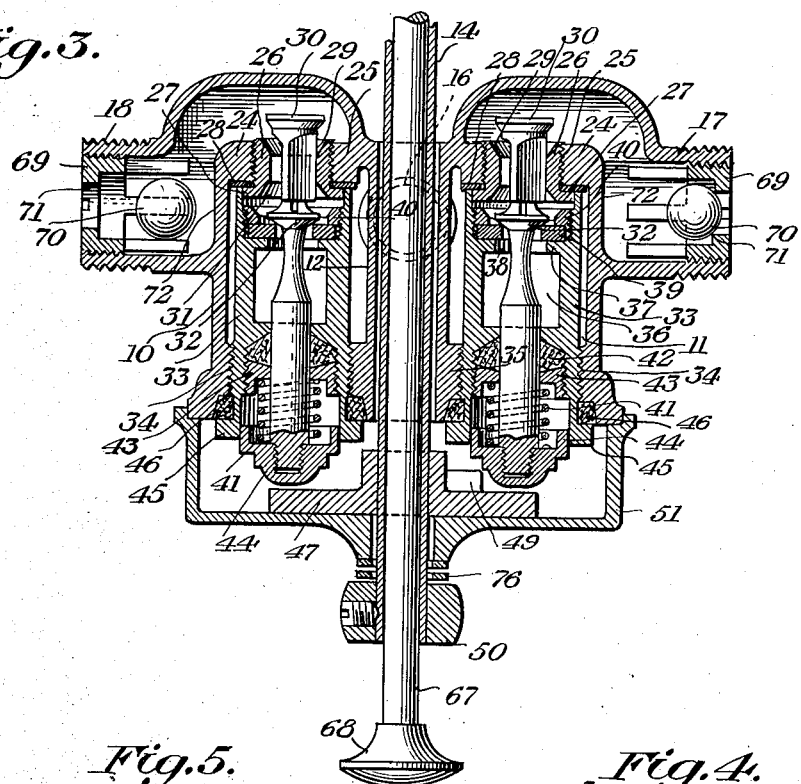
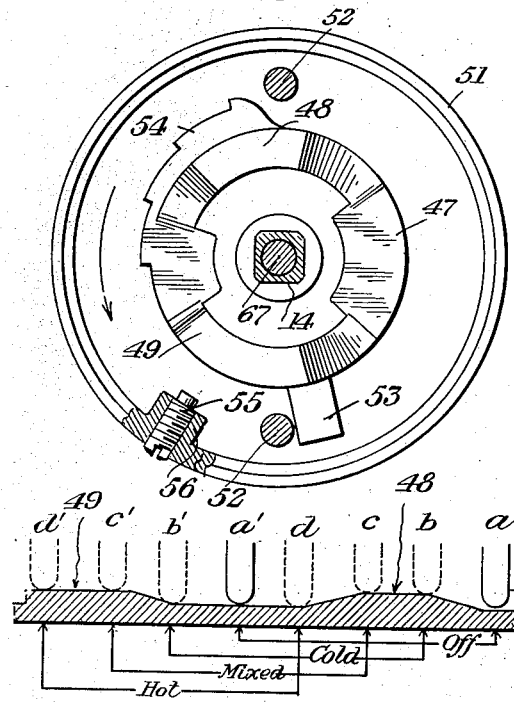
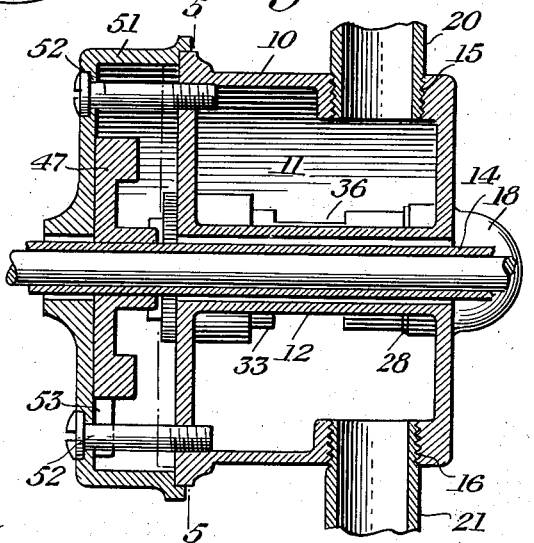
Franklyn J. Wolff
INVENTOR
ATTORNEYS Patented June 23, 1936

2,045,308

UNITED STATES PATENT OFFICE 2,045,308

MIXING VALVE

Franklyn J. Wolff, Morrisville, Pa.

Application December 9, 1933, Serial No. 701,691

6 Claims. (Cl. 277—1)

The object of the invention is to provide a mixing valve for use in connection with bathtubs, laundry tubs, lavatories and the like, so that with the one unit, either hot or cold water may be drawn selectively, or the one tempered with the other to meet the desires of the user; to provide a valve of this nature having an operative connection with the waste plug to permit the seating or unseating of the latter by manipulation of the valve operating medium and that irrespective of its setting with regard to permitting the flow of water or the stoppage of the same; to provide a mixing valve adapted for installation with bathtubs equipped with showers to permit the user to direct the tempered water selectively through the tub inlet or through the shower; to provide a mixing valve which will permit the repair of its parts without the necessity for having to shut off the supply of water since this is automatically accomplished in the removal of any valve element; to provide a mixing valve designed to automatically prevent an excess of pressure at either the hot or cold water inlet entering the inlet of the other; and generally to provide a mixing valve designed to carry out all the indicated functions and which will be of simple form, susceptible of comparatively cheap manufacture and in which the construction of the parts is of a character that will preclude there being damage under ordinary usage.

With this object in view, the invention consists in a construction and combination of parts of which a preferred embodiment is illustrated in the accompanying drawings, wherein:

Figure 3 is a horizontal diametrical sectional view through the improved valve.

Figure 4 is a vertical diametrical sectional view through the same.

Figure 5 is a sectional view on the plane indicated by the line 5—5 of Figure 4.

Figure 6 is a diagrammatic view showing the cam laid out in the form of a straight line to indicate the manner in which it functions in operating the valve to secure the desired temper of the water.

Figures 1, 2:
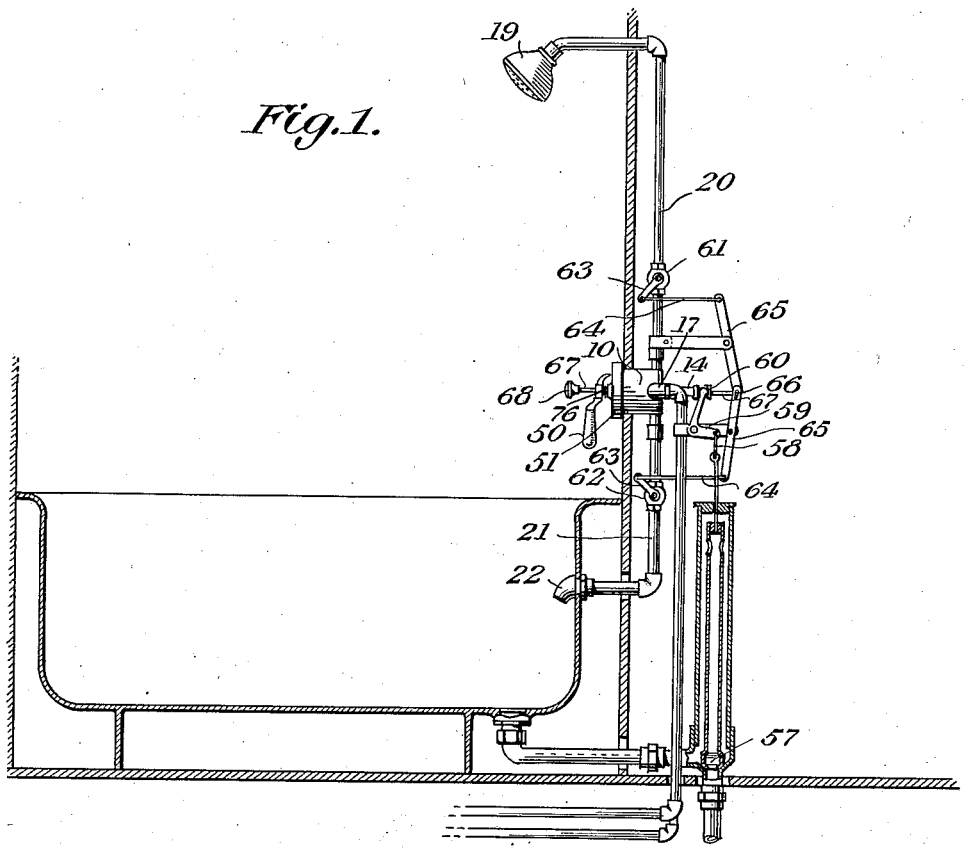
Figure 1 is a view partly in elevation and partly in section, showing the invention applied to use as a valve controlling admission of water to a bathtub equipped with a shower.
Figure 2 is a view similar to Figure 1 but showing the valve in use in connection with a lavatory.

The valve comprises a case or body 10, preferably cylindrical, defining an annular mixing chamber 11 by reason of its central sleeve portion 12 which serves as a guide through which the valve actuating stem 14 passes. The body or case 10 is provided with the lateral outlets 15 and 16 and the lateral inlets 17 and 18, the outlet 16 being designed for connection with the fixture inlet and the outlet 15 with a shower 19 as by a pipe 20. A pipe 21 connects the outlet 16 with the fixture inlet 22 and if the valve be used with a lavatory, as indicated in Figure 2, the outlet 15 is plugged as indicated at 23.

The webs 24 separate the inlets 17 and 18 from the mixing chamber 11 and these webs are drilled and tapped, as indicated at 25, to receive the bushings 26, the bushings being formed with peripheral flanges 27 on the chamber side of the webs to seat against gaskets 28, preferably lead. The bushings 25 at the ends remote from the flanges have the seats 29 against which the valves 30 seat, the valves having cross-sectionally star-shaped stems slidably mounted in the bushings. At the flange side, the bushings are flared as indicated at 31 to provide a clearance space for the passage of water when the valve plugs 32 are unseated.

The valves 32 are mounted in the plug members 33, the latter being threadingly engaged as indicated at 34 with webs 35 formed as parts of the front wall of the mixing chamber 11. The plugs 33 are hollowed out as indicated at 36 and the walls 37 are formed with openings 38, the stems of the valves 32 passing through these openings and the valves normally engaging seats bounding openings in gaskets 39 which are seated in counterbores at the inner ends of the plugs, the gaskets being retained in place by means of rings 40 threadingly engaged in the counterbore. The annular flanges formed at the inner ends of the plugs by reason of the counterbores embrace the flanges 27 of the bushings 26 and seat on the lead gasket 28.

The valves 32 are normally but yieldingly held on their seats on the gasket 39, and in such a position the valves 30 are held off of their seats in the bushings 26, the ends of their stems abutting the valves 32. When the valves 32 are unseated, the valves 30 are moved still further away from their seats, so that water through the inlets may pass through the bushings, through the openings 38 and through the hollowed-out portion 36 into the mixing chamber 11. Should it be necessary to move the valve 32 for repairs, it is moved bodily with its plug 33, when the water pressure through the inlet will move the attendant valve 30 onto its seat, thus preventing any passage of water from the inlet into the mixing chamber. Thus such repairs as are necessary can be made to the valve and it can be replaced, this operation effecting unseating of the valve 30 to place the control between the inlet and the mixing chamber solely on the valve 32.

The means for retaining the valves 32 on their seats consist of compression springs 41 surrounding the stems of the valves 32 and enclosed in counterbores at the outer ends of the plugs 33. The packing 42 surrounds the stems of the valves 32 at the bottom of the counterbore and is retained in position by follower rings 43 which are threaded in the counterbore and against which the inner ends of the springs 41 abut. The outer ends of the springs abut the inner faces of bonnet nuts 44 threaded on the outer ends of the stems.

The plugs 33 are peripherally flanged, as indicated at 45, at their outer ends and these flanges seat upon packing rings 46, so as to preclude any leakage around the plugs through the webs in the front wall of the casing 10.

The means for actuating the valves 32 to unseat them consists of a cam 47 having the rises 48 and 49, the one to engage the bonnet nut 44 of one of the valves 32 and the other to engage the nut of the opposite valve. The cam 47 is a face cam and is rotated through the instrumentality of the valve actuating stem 14, being mounted on the stem to permit relative axial movement of the two but to preclude relative angular or turning movement. Thus when the stem is rotated, as it may be by its actuating handle 50, the cam is rotated. The cam is housed in a cap member 51, secured to the case 10 by means of cap screws 52. Projecting radially from the cam is an arm 53 which, in the off position of the valves, will abut one of the cap screws 52. The cam is also provided with an arcuate stepped radially extending web 54 which, in conjunction with the abutment screw 55, functions to limit the valve opening movement of the cam selectively to various points. The screw is threadingly mounted in a radially inwardly projecting lug 56 mounted on the interior face of the flange of the cap member 51 and if adjusted in a sufficient distance, it will be in obstructing relation to the first step of the web. Withdrawal of the screw may position it to dispose it in obstructing relation to any one of the other steps.

While angular or turning movement of the actuating stem effects valve opening and closing movement, its axial movement is designed to effect waste stopper opening and closing movement, the stem having an operative connection with the conventional waste stopper 57 by reason of having its stem connected through the medium of the link 58 with one of the arms of the bell crank lever 59, the latter having an operative connection 60 with the inner end of the actuating stem 14 to permit angular or turning movement of the stem with respect to the lever arm but to preclude axial movement of the stem independent of the lever arm. Thus if the stem be moved axially, the bell crank lever will be rocked and the stopper either seated or unseated, depending on the direction of movement of the stem.

The stem is made hollow to adapt the valve for bathtub use where the latter is equipped with a shower, so that the water may be diverted either through the outlet 22 or through the shower 19. The pipe 20 leading to the shower includes a conventional valve 61 while the pipe 21 includes a similar valve 62. Both the valves 61 and 62 are provided with lever handles 63 which are connected by means of links 64 with the rock levers 65, the rock levers having intermediate pivotal mountings and their adjacent ends having pin and slot connections 66 with the inner end of a push rod 67 slidably mounted in the bore of the valve actuating stem 14 and being provided with a push knob 68 at its outer end. When the valve 63 is open, the valve 62 is closed and vice versa. Thus, if the push rod 67 is moved in one direction, it will open the valve 63 and close the valve 62. If pushed in the other direction, it will effect the reverse settings of these valves. Therefore, the water admitted to the mixing chamber 11 in the valve case may be directed either through the shower or through the tub outlet. Where the valve is employed for use with a lavatory or with laundry tubs, where there is no need for directing water through any one of several outlets, the push rod is omitted, the outlet from the mixing chamber then being limited to one outlet by the plugging of the other as indicated at 23 in Figure 2 and as hereinbefore referred to.

In the operation of the valve, when the arm 53 abuts that cap screw 52 which it is designed to engage in the off position, the bonnet nuts of the valves 32 are opposite the low points on the cam. As the valve is moved to open position, the rise 48 first becomes effective, depressing from its seat the valve 32 controlling the cold water inlet to the mixing chamber. As continued angular movement is imparted to the cam, full open position of the valve controlling the admission of cold water is maintained, as clearly shown at b in Figure 6, until finally initial opening movement is imparted to the other valve 32 controlling the admission of hot water to the mixing chamber. The rotation of the cam is then continued until the desired temper of water is obtained and if further continued, full opening movement will be imparted to the valve 32 controlling the admission of hot water, thus equalizing the amounts of hot and cold water, as indicated at c', Figure 6. If only hot water be desired, angular movement of the cam is continued in the same direction, bringing its low point opposite the bonnet nut of the valve controlling the cold water, thus permitting the latter to be shut off, but leaving the valve controlling the hot water fully open, as indicated at d', Figure 6.

In order that there may be no passage of cold water through the mixing chamber to the hot water inlet and vice versa in the event of an excess of pressure in the one, check valves are provided in the inlets 17 and 18, these check valves consisting of valve cages 69 threaded in the inlets and caging the balls 70 which may move from their seats 71 in the cages into engagement with the wall 72. As water passes through the inlets, the balls are driven back against the walls 72 but should the pressure on one side exceed the pressure on the other, the ball will be moved onto its seat 71, thus closing that inlet to the admission of water due to the excess of pressure on the other side. This arrangement thus precludes the passage of cold water into the hot water pipes or vice versa, due to any unbalance in pressure on the two sides.

When the valve is used in connection with a lavatory, as indicated in Figure 2, the waste stopper 74 is actuated by a series of links and levers generally indicated at 75, the terminal link of the series being connected to the bell crank lever 59.

A cushioning member 76 in the form of a compression spring is disposed in surrounding relation to the stem 14, being interposed between the actuating handle 50 and the thickened central portion of the cover member 51, this cushioning member taking any impact from the actuating handle in the inward movement of the stem to seat the waste stopper.

The invention having been described, what is claimed as new and useful is:

1. A mixing valve comprising a housing defining a mixing chamber and formed with an outlet from said mixing chamber and also formed with cold water and hot water inlets, valves controlling communication between said inlets and said mixing chamber, a cam, an actuating stem for said cam to impart angular or turning movement to the same, the cam being formed with a plurality of rises arranged to successively or simultaneously unseat said valves depending on the amount of angular movement imparted to said actuating stem, and means to limit the amount of angular movement of said cam to prescribed angular distances, said means comprising a peripherally stepped web on the cam and an adjustable abutment for movement into obstructing position with reference to any of said steps.

2. A mixing valve comprising a housing defining a mixing chamber and formed with a duality of outlets for connection respectively to a bathtub inlet and to a shower, the housing being also formed with cold water and hot water inlets, valves controlling communication between said inlets and said mixing chamber, means for singly or simultaneously actuating said valves and comprising an angularly movable stem, a push rod passing slidably through said stem, valves in communication with said outlets and positioned beyond the same, and actuating means for said valves, said actuating means being connected with said push rod to co-ordinate the valves so that when one is opened the other is closed, axial movement of said push rod operating said actuating means.

3. A mixing valve comprising a casing defining a mixing chamber and formed with an outlet therefrom and with cold water and hot water inlets thereinto, valves controlling communication between said inlets and said mixing chamber, a cap member detachably secured to the front wall of the casing, a cam enclosed by the cap member, an actuating stem for said cam to impart angular or turning movement to the same, the valves having stems extending through the front wall of the housing into the cap and being therein formed with cam engaging elements, the cam being provided with a plurality of rises arranged to successively or simultaneously unseat said valves depending on the angular movement imparted to said actuating stem, and adjustable cap carried means for positioning to invade the path of movement of spaced steps carried by the cam to limit the angular movement of the latter to a prescribed angular distance.

4. A mixing valve comprising a casing defining a mixing chamber and formed with an outlet therefrom and cold water and hot water inlets thereinto, the casing having a web between said inlets and said mixing chamber and formed with openings placing said inlets in communication with the mixing chamber, plugs extending through the front wall of the casing and abutting said web in axial alignment with said openings, valves closing openings in said plugs opposite the openings in the web, the plugs being hollowed out to effect communication between said openings and mixing chamber, the valves having stems extending through the outer ends of the plugs, a cap secured to the front of the housing, a cam disposed within said cap, an actuating stem for said cam to impart angular or turning movement to the same, the cam being formed with a plurality of rises arranged to engage said valve stems and successively or simultaneously unseat said valves depending on the amount of angular movement imparted to said stem, and adjustable means to limit the amount of angular movement to said cam to a prescribed angular distance.

5. A mixing valve comprising a housing defining a mixing chamber and formed with an outlet from said mixing chamber and also formed with cold water and hot water inlets, valves controlling communication between said inlets and said mixing chamber, a cam, an actuating stem for said cam to impart angular or turning movement to the same, the cam being formed with a plurality of rises arranged to successively or simultaneously unseat said valves depending on the amount of angular movement imparted to said actuating stem, and means to limit the amount of angular movement of said cam to prescribed angular distances, said means comprising a peripherally stepped web on the cam and a screw threaded radially through the housing for movement into obstructing position with reference to any of said steps.

6. A mixing valve comprising a housing defining a mixing chamber and formed with a duality of outlets for connection respectively to a bathtub inlet and to a shower, the housing being also formed with cold water and hot water inlets, valves controlling communication between said inlets and said mixing chamber, means for singly or simultaneously actuating said valves and comprising an angularly movable stem, a member carried by said stem but manually movable with respect thereto, valves in communication with said outlets and positioned beyond the same, and actuating means for said valves, said actuating means being connected with said member to coordinate the valves so that when one is opened the other is closed, manual movement of said member operating said actuating means.

FRANKLYN J. WOLFF.